United States Patent

[11] 3,603,090

| [72] | Inventors | Brian Arthur Billinger<br>Worsthrorne, near Burnley;<br>Francis Peter MacNamara, Nelson; George Samuel Cooper, Rawthenstall, all of, England |
|---|---|---|
| [21] | Appl. No. | 847,556 |
| [22] | Filed | Aug. 5, 1969 |
| [45] | Patented | Sept. 7, 1971 |
| [73] | Assignee | Rolls-Royce Limited<br>Derby, England |
| [32] | Priority | Aug. 8, 1968 |
| [33] | | Great Britain |
| [31] | | 37,881/68 |

[54] THRUST REVERSER FOR FAN TYPE JET PROPULSION ENGINES
2 Claims, 6 Drawing Figs.

[52] U.S. Cl. ................................................ 60/226, 60/229, 60/230, 239/265.29, 239/265.31
[51] Int. Cl. ....................................................... F02k 1/20, F02k 3/06, B64c 15/06
[50] Field of Search ........................................... 60/226, 229, 230; 239/265.29, 265.31

[56] References Cited
UNITED STATES PATENTS

| 2,841,956 | 7/1958 | Gunson et al. | 239/265.29 |
| 2,950,595 | 8/1960 | Laucher et al. | 239/265.31 |
| 3,036,431 | 5/1962 | Vdolek | 60/229 |
| 3,059,426 | 10/1962 | Laucher et al. | 239/265.31 |
| 3,262,268 | 7/1966 | Beavers | 60/230 X |
| 3,347,467 | 10/1967 | Carl et al. | 239/265.31 |
| 3,500,645 | 3/1970 | Hom | 60/226 X |
| 3,511,055 | 5/1970 | Timms | 60/229 |

*Primary Examiner*—Al Lawrence Smith
*Attorney*—Cushman, Darby & Cushman

ABSTRACT: In a gas turbine jet propulsion fan engine, the fan duct outer wall is provided with primary and secondary fan air blocker flaps. In the nonoperative position, both sets of flaps cooperate to provide a continuous duct outer wall and in the operative position, the primary flaps fold upon themselves across the duct so as to block it and the secondary flaps translate rearwards, the effect being to provide a radial outlet for the fan air, which outlet is substantially clear of structure.

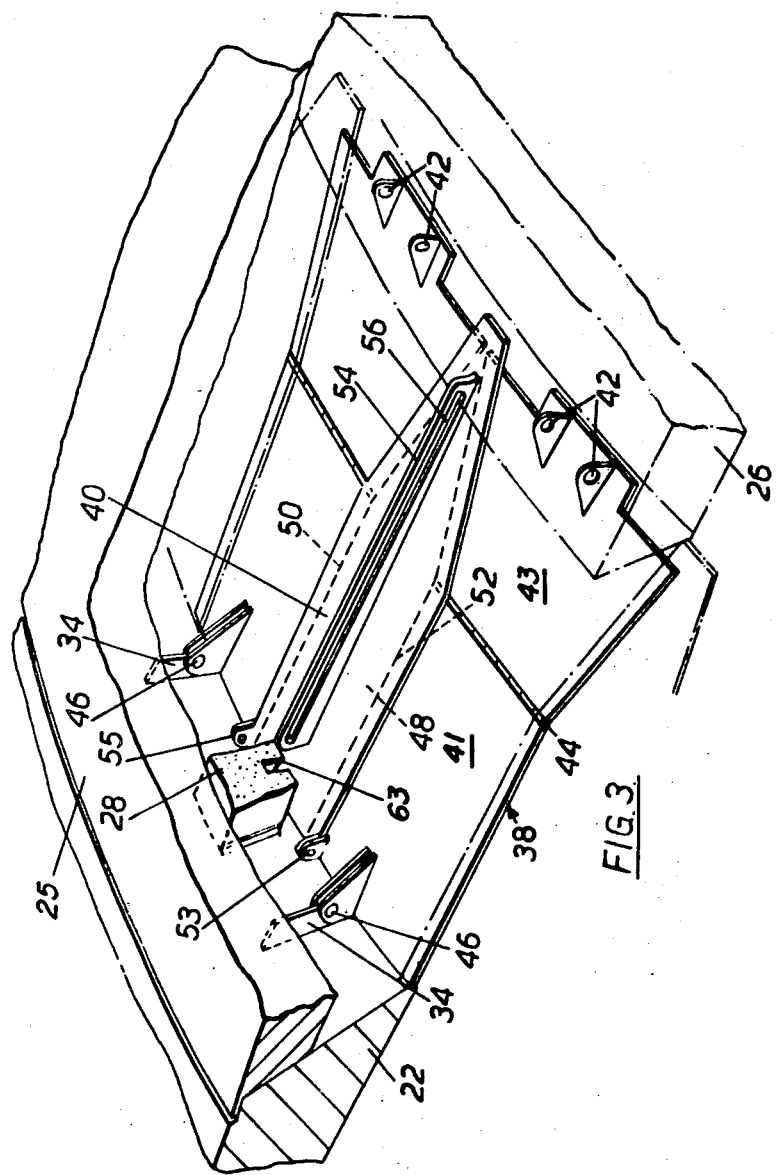

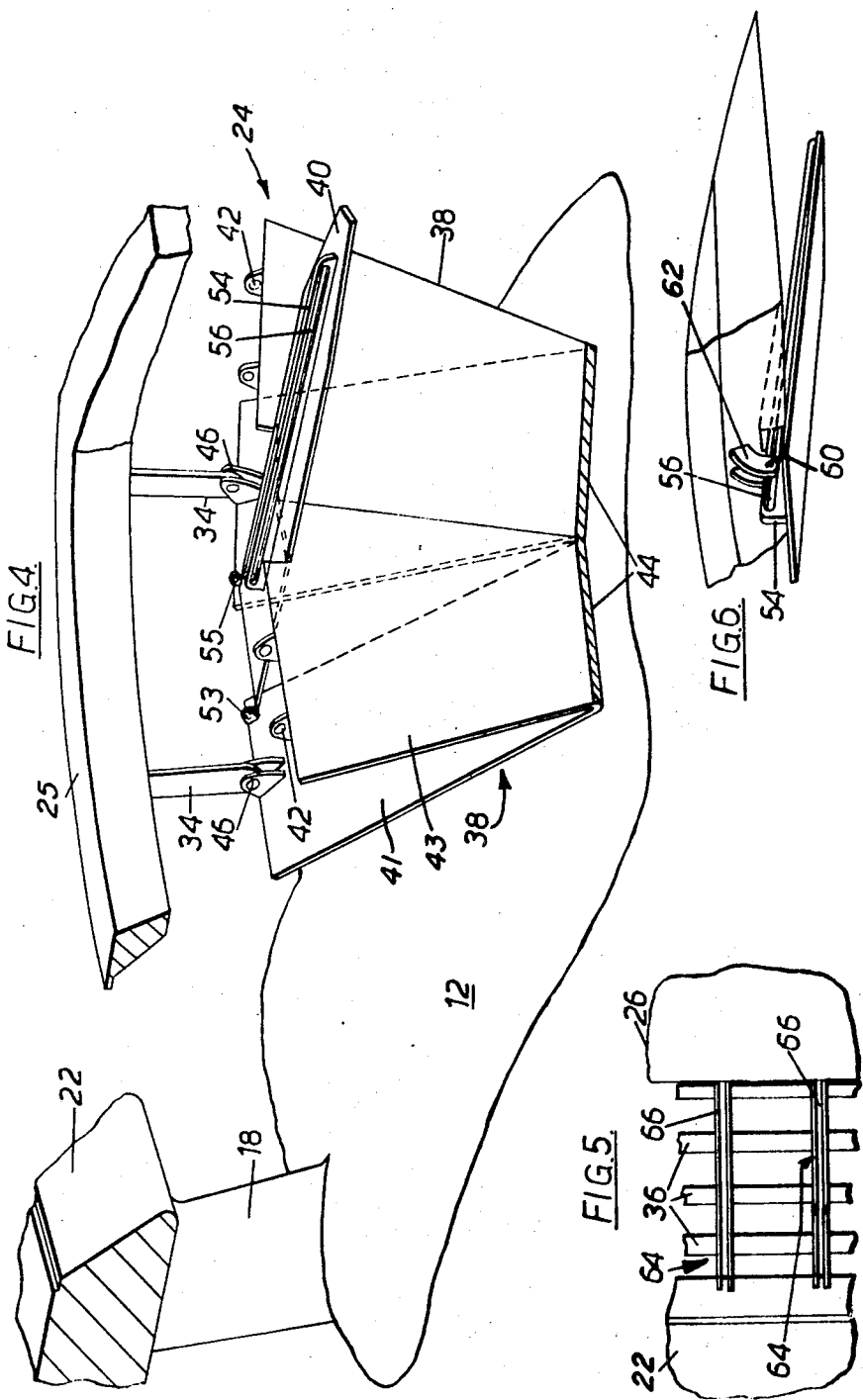

THRUST REVERSER FOR FAN TYPE JET PROPULSION ENGINES

This invention concerns thrust reverser for fan flow ducts.

According to the present invention there is provided a fan duct defined by two radially spaced-apart walls in which at least a part of the outer wall comprises two sets of flaps arranged circumferentially thereof and arranged alternately with respect to each other, one set being adapted to pivot about one end radially inwards and the other set being adapted to translate axially of the duct, the combined effect being to provide a substantially unobstructed annular gap in said outer wall and common actuating means for effecting said pivotting and translating of the respective sets of flaps.

Preferably the one set of flaps is pivotally connected by their downstream ends to the remaining portion of the duct outer wall.

Preferably the fan duct outer wall has a further wall radially outwardly spaced therefrom, this further wall having an annular portion which is radially aligned with the flaps in the fan duct outer wall, which annular portion is adapted to translate axially of the duct.

Preferably the annular portion of the further wall is connected to the one set of flaps for movement thereof when the annular portion is translated.

The one set of flaps are hinged within their axial lengths so as to fold upon themselves as they pivot radially inwards.

Preferably both sets of flaps are interconnected for relative pivotal movement.

Furthermore the other set of flaps are preferably also connected to fixed structure in such a manner that they may translate axially and simultaneously with said relative pivotal movement.

Preferably the translation of the annular member is effected by powered rams or the like.

Preferably, though not restrictively so, the fan duct is the fan duct of a gas turbine jet propulsion fan engine, that is, a gas turbine jet propulsion engine which has a plurality of fan blades coaxially and rotatably mounted at its upstream end, upstream of the engine outer casing and extending radially beyond thereof.

Furthermore the outer wall comprises part of an annular cowl which surrounds the fan blades and at least part of the engine outer casing.

The one set of flaps are adapted to be pivoted so that they contact the duct inner wall and block the flow of air therethrough and the other set of flaps are adapted to simultaneously translate to a position downstream of the one set of flaps, thus a substantially unobstructed annular gap is opened in the cowl, wherethrough air may pass, radially of the duct, to atmosphere.

Preferably, guide vanes are provided in the annular gap, whereby the air may be deflected so as to flow out of the gap in a substantially upstream direction and thus provide a reverse thrust effect.

The invention will now be described with reference to the accompanying drawings in which:-

FIG. 3 is a pictorial view of the flaps

FIG. 4 is a further pictorial view of the flaps

FIG. 5 is a view on arrow 5 in FIG. 1

FIG. 6 is a further pictorial view of one of the flaps.

Figure 1:
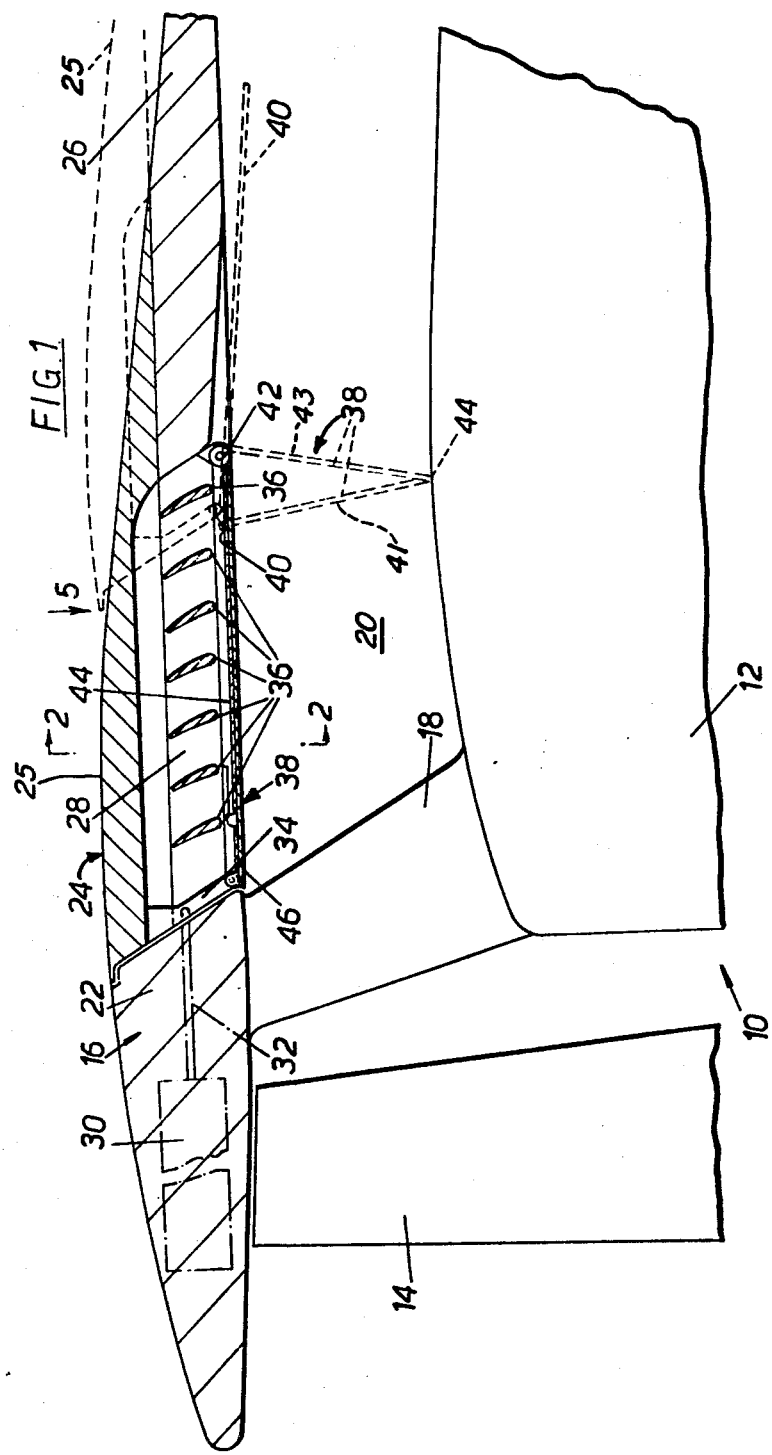
FIG. 1 is an axial part section through a gas turbine jet propulsion fan engine.
Figure 2:
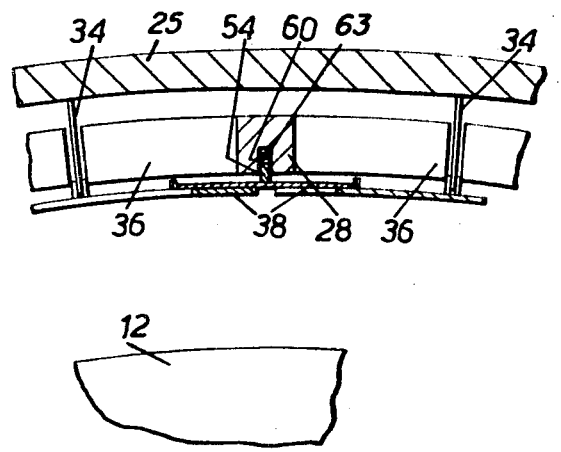
FIG. 2 is a section on line 2—2 of FIG. 1

In FIG. 1 a gas turbine jet propulsion fan engine is indicated generally by the numeral 10. An outer casing 12 contains compressor, combustion equipment and expansion turbine, arranged in flow series, but none of which are shown.

A single stage of fan blades 14 is coaxially mounted on the engine, the blades being driven by shafting which is now shown, but which is supported within the engine.

A cowl 16 surrounds the fan blades 14 and at least a part of engine casing 12 and the cowl is spaced from casing 12 by a plurality of circumferentially spaced struts 18. Thus a duct 20 is formed between casing 12 and cowl 16.

Cowl 16 is divided into three parts, a fore part 22 and an aft part 26 forming a portion of the outer flow surface of the cowl 16, which parts are rigidly connected by a plurality of circumferentially spaced axially extending beams 28, and a translatable sleeve section 24 intermediate the fore and aft parts 22 and 26, respectively, which is adapted to translate in a downstream direction, to a position indicated by dotted lines. The translation is effected by the actuation of rams 30 which are connected to sleeve section 24 by rods 32 and a plurality of radially inwardly extending legs 34 fixed to a rigid outer wall 25 of sleeve section 24.

Beams 28 act as location members for a series of circumferentially extending air guide vanes 36. FIG. 1 shows the guide vanes 36 to be substantially aerofoil shape in axial cross section and they are shaped like this so as to provide aerodynamic airflow surfaces, the reason for which is described later in this specification.

The arrangement of cowl 16 is such that an annular outlet is provided for air to flow through in a radially outwards direction if required to do so. Such a requirement would arise if either a spoiling of the thrust produced by the fan is desired, or if reverse thrust of the fan air is desired. To achieve both of these conditions the air which flows from fan blades 14 through duct 20 must be turned radially outwards, thus the sleeve section 24 is provided two sets of movable flaps 38 and 40 defining a collapsible inner wall, the flaps 38 being blocker flaps in thrust reversing position and the flaps 40 being fillet flaps in the cruise position. The flaps 38 and 40 define a portion of the inner flow surface of the cowl 16 when the flaps are in the cruise position.

Flaps 38 are arranged circumferentially of the duct 20 and extend axially for the full length of the gap between fore part 22 and aft part 26. Flaps 38 are hinged at 42 at their downstream ends to aft portion 26 and each of the flaps 38 is formed into two sections 41 and 43, the two sections being also pivotally joined directly to each other at 44 at approximately the flaps mid length.

Furthermore, flaps 38 are also pivotally connected to the radially inner ends 46 of legs 34 and its is through this latter connection that said flaps 38 derive their movement.

When rams 30 are actuated, sleeve section 24 is translated in a downstream direction, and the movement of rigid outer wall 25 immediately exerts an axial load via connection 46, on the flaps 38. The sections 41 and 43 of flaps 38 commence to fold about joint 44 and at the same time, the flaps 38 pivot about pivot axis 42, until the joint 44 contacts the casing 12 of the engine and blocks duct 20 as shown in dotted lines.

It will be appreciated by those skilled in the art that as flaps 38 form part of the duct outer wall when in an inoperative cruise, or non blocking position, as shown in full lines in FIG. 1, but when required to block duct 20, they must pivot on to a smaller diameter, the flaps must either overlap each other as they pivot, or their geometry must be such that their edges can abut each other when they reach the blocking position.

Thus flaps 38 have profiles (as seen in FIGS. 3 and 4,) which permit said flaps to abut each other when they are in the blocking position. The geometry is such that a space is left between each adjacent pair of flaps 38 when the flaps are in the inoperative position. The space is indicated by the numeral 48 in FIG. 3 and is bounded by the two concealed edges 50 and 52 in an adjacent pair of flaps 38. In order to ensure that space 48 is substantially sealed against flow of air through duct 20, fillet flaps 40 are adapted to be superimposed on flaps 38, the arrangement being such that one flap 40 overlaps two adjacent flaps 38 and, thus, the flaps 40 also form part of the duct outer wall and a portion of the inner flow surface of the cowl 12.

When it is desired to block the flow of air through duct 20 and to deflect the air through guide vanes 36, in order to ensure maximum efficiency from the airflow therethrough, it is essential to remove all obstructions from the gap between fore part 22 and aft part 26, thus, flaps 40 are pivotally connected at 53 and 55 at their upstream ends to the upstream ends of flaps 38 and when flaps 38 are moved as described, flaps 40 are also moved. However, flaps 40 are adapted to translate in a substantially straight line and in a downstream direction and, so as to assist this movement, flaps 40 are each provided with a raised spine 54 in which a slot 56 is machined. Spine 54 is not shown in FIG. 1 for reasons of clarity but it is shown in FIG. 2 to 4 and FIG. 6.

In their nonoperative position each of flaps 40 has its downstream and supported by a pin 60 which is fixed across a space 58 between two brackets 62 fixed to aft portion 26 which pin passes in sliding engagement through slot 56. A groove 63 is provided in each beam 28 so as to effect a clear path for spine 54 when flaps 40 are translated. Furthermore, the corners at the downstream ends of flaps 38 are relieved so as to provide a clear path for flaps 40 during translation thereof.

FIG. 5 shows the guide vanes 36 fixed to fore and aft points 22 and 26 respectively by double wall members 64 which extend axially of the gap between said portions. Members 64 provide channels 66 through which legs 34 can travel when sleeve section 24 is translated.

It will be seen from the foregoing description that when thrust spoiling or thrust deflecting is required, the radial gap between fore and aft portions 22 and 26 respectively is cleared of all undesirable obstructions, except for beams 28 and thus provide a nozzle outlet for the deflected fan air, which nozzle outlet is free of choking and like effects.

FIG. 4 shows flaps 38 and 40 folded, pivoted and translated respectively but guide vanes 36 are not shown.

FIG. 6 shows flap 40 in the fully translated position.

We claim:

1. A thrust reverser for a fan-type jet propulsion engine having a casing wall and a fan concentric therewith and extending radially beyond said wall, said thrust reverser comprising: a cowling surrounding said fan and spaced from said casing wall to form an annular fan duct, said cowling being split and separated into stationary forward and aft cowl parts fixed relative to each other to provide an annular opening therebetween, said forward and aft parts forming a portion of inner and outer flow surfaces for said cowling, a ring structure having a plurality of flow reversing guide vanes, said ring structure being disposed within said annular opening and being interconnected with said forward and aft cowl parts of said cowling, a translatable sleeve section disposed between said forward and aft cowl parts when in cruise position, said sleeve section having a rigid outer wall slidable over said fixed aft portion and a collapsible inner wall, both of said outer and inner walls of said sleeve section forming another portion of the outer and inner flow surfaces respectively when in cruise position, said collapsible inner wall comprising a plurality of peripherally disposed blocker flaps of which the adjacent sides of each when in cruise position are overlapped by respective fillet flaps, said blocker flaps being hinged to the aft cowl part for pivoting thereabout, each of said blocker flaps being formed in two sections hinged directly together at the midlength of the flaps so that the sections can collapse upon themselves, said blocker flaps further being hinged at their upstream ends to said rigid outer wall, each of said fillet flaps being pivotally connected at each side of its upstream end to the upstream end of a respective blocker flap and axially slidably connected to said ring structure, the arrangement being such that when said translatable sleeve section translates over said aft cowl part so as to expose the guide vanes of said ring structure, said collapsible inner wall of blocker flaps collapses and pivots across said fan duct to block passage of fan air therethrough and said fillet flaps translate axially downstream in a direction substantially parallel to said fan duct and between adjacent edges of said blocker flaps, thus fully exposing said vanes to the flow of fan air in the fan duct.

2. A thrust reverser as claimed in claim 1 wherein rams are mounted in the forward cowl part of said cowling, said rams being operatively connected to said translatable sleeve section for selectively moving the same to expose or cover said vanes.